(12) United States Patent
Mikesell et al.

(10) Patent No.: US 9,500,476 B2
(45) Date of Patent: Nov. 22, 2016

(54) LINEAR POSITION MONITORING SYSTEM

(71) Applicant: Waterman Industries, Inc., Exeter, CA (US)

(72) Inventors: Kenneth W. Mikesell, Arvada, CO (US); Darryl Ray Pauls, Visalia, CA (US)

(73) Assignee: Waterman Industries, LLC, Exeter, CA (US)

( * ) Notice: Subject to any disclaimer, the term of this patent is extended or adjusted under 35 U.S.C. 154(b) by 276 days.

(21) Appl. No.: 13/784,692

(22) Filed: Mar. 4, 2013

(65) Prior Publication Data
US 2014/0245625 A1 Sep. 4, 2014

Related U.S. Application Data

(60) Provisional application No. 61/676,430, filed on Jul. 27, 2012.

(51) Int. Cl.
*G01B 21/00* (2006.01)
*G01B 21/04* (2006.01)
*F16H 25/20* (2006.01)
*G01D 5/16* (2006.01)

(52) U.S. Cl.
CPC ........... *G01B 21/04* (2013.01); *F16H 25/2015* (2013.01); *G01D 5/16* (2013.01)

(58) Field of Classification Search
CPC ............ G01D 5/34707; G01D 5/34753; G01D 5/2457; G01B 3/002
USPC .............................................. 33/706; 137/554
See application file for complete search history.

(56) References Cited

U.S. PATENT DOCUMENTS

| 1,356,485 | A | | 10/1920 | Bunker |
| 1,501,437 | A | * | 7/1924 | Connet .................. G08C 19/38 137/554 |
| 1,734,419 | A | * | 11/1929 | Chitty ................... H02P 7/0038 137/552 |
| 2,099,971 | A | | 11/1937 | Dailey |
| 2,791,179 | A | | 5/1957 | Dorer |
| 2,986,646 | A | | 5/1961 | Ding |
| 3,239,616 | A | * | 3/1966 | Rosenston ...................... 200/47 |
| 3,952,522 | A | | 4/1976 | Shettel |
| 4,114,132 | A | | 9/1978 | DeRouen et al. |
| 4,131,131 | A | * | 12/1978 | Frisch ....................... F16K 3/10 137/559 |
| 4,442,390 | A | | 4/1984 | Davis |

(Continued)

OTHER PUBLICATIONS

Harlingen Irrigation District. Innovative Technologies in Agriculture. Final Report dated Dec. 21, 2011; Texas.

*Primary Examiner* — Yaritza Guadalupe-McCall
(74) *Attorney, Agent, or Firm* — Craig R. Miles; CR Miles P.C.

(57) ABSTRACT

Generally, a linear position monitor including a rotatable member having a toothed periphery configured to directly rotatably engage a longitudinal linear portion of a spiral thread coupled to an elongate member whereby an amount of linear travel of the elongate member directly reversibly rotatably drives the rotatable member operationally coupled to a linear position indicator calibrated to translate rotation of the rotatable member about the rotation axis into an elongate member location value corresponding to a location of the elongate member in the amount of linear travel.

19 Claims, 11 Drawing Sheets

(56) References Cited

U.S. PATENT DOCUMENTS

| | | | |
|---|---|---|---|
| 4,635,901 A * | 1/1987 | Pond | F16K 37/0008 |
| | | | 116/285 |
| 4,712,441 A | 12/1987 | Abraham | |
| 4,816,987 A * | 3/1989 | Brooks | F16K 31/046 |
| | | | 137/487.5 |
| 4,854,189 A | 8/1989 | Ulbing | |
| 4,881,719 A * | 11/1989 | Bowman | F16K 3/316 |
| | | | 251/326 |
| 5,634,373 A | 6/1997 | Cuffe et al. | |
| 5,809,833 A * | 9/1998 | Newport et al. | 74/89.37 |
| 6,078,249 A | 6/2000 | Slavik et al. | |
| 6,424,928 B1 * | 7/2002 | Elliott et al. | 702/151 |
| 6,427,718 B1 | 8/2002 | Stringam et al. | |
| 6,471,182 B1 * | 10/2002 | McIntosh | F16K 31/046 |
| | | | 251/129.12 |
| 6,698,776 B2 * | 3/2004 | Todd | A63C 17/004 |
| | | | 280/11.19 |
| 7,338,124 B2 | 3/2008 | McMillen | |
| 7,502,703 B2 * | 3/2009 | DeJong | B65H 5/062 |
| | | | 33/712 |
| 8,256,313 B2 * | 9/2012 | Ganter | 74/335 |
| 2004/0256171 A1 * | 12/2004 | Sugitani | 180/402 |
| 2012/0031494 A1 * | 2/2012 | Lymberopoulos | E21B 47/12 |
| | | | 137/1 |

* cited by examiner

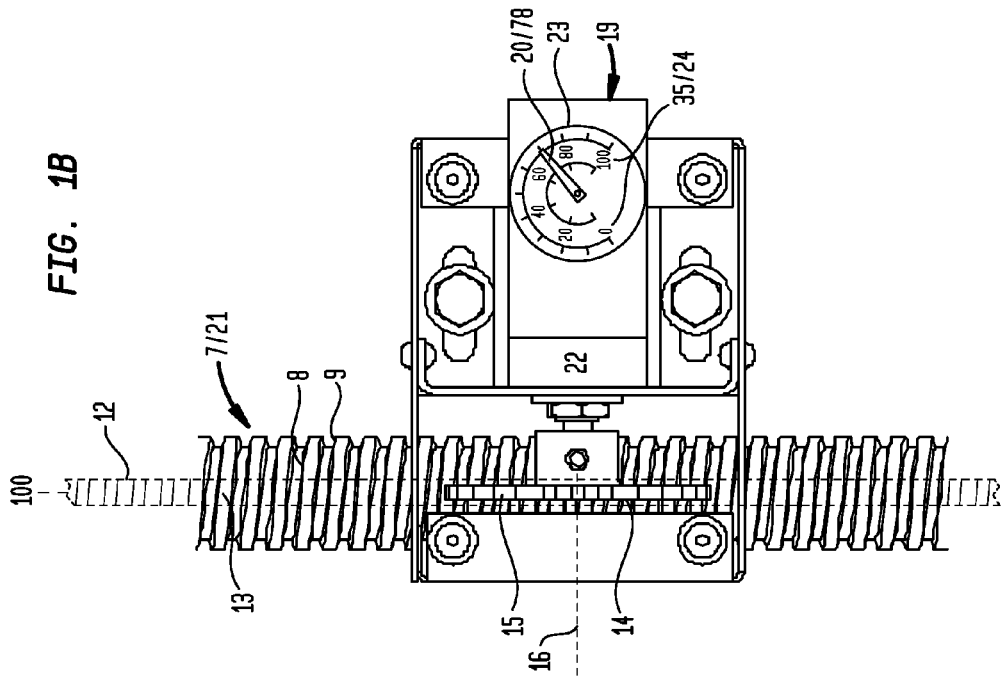
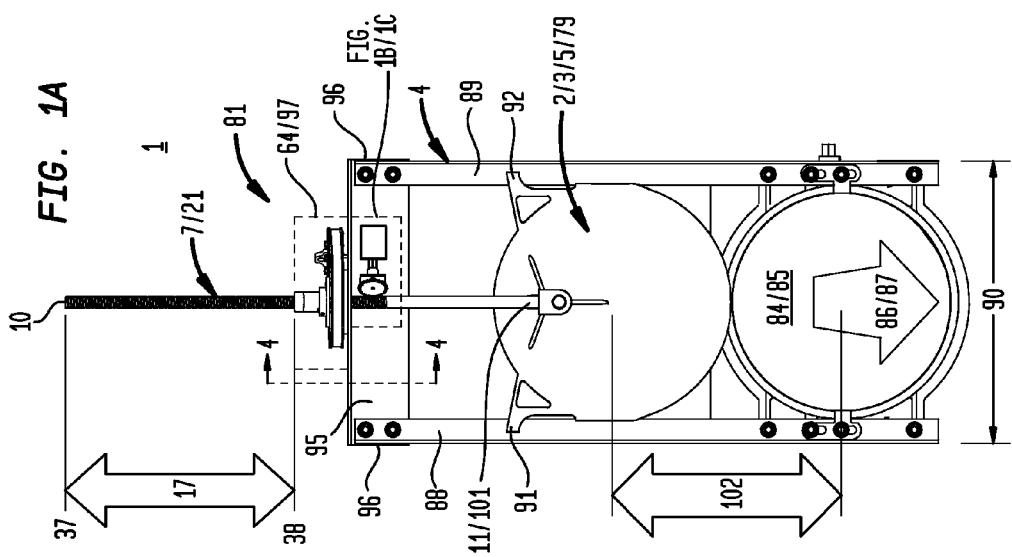

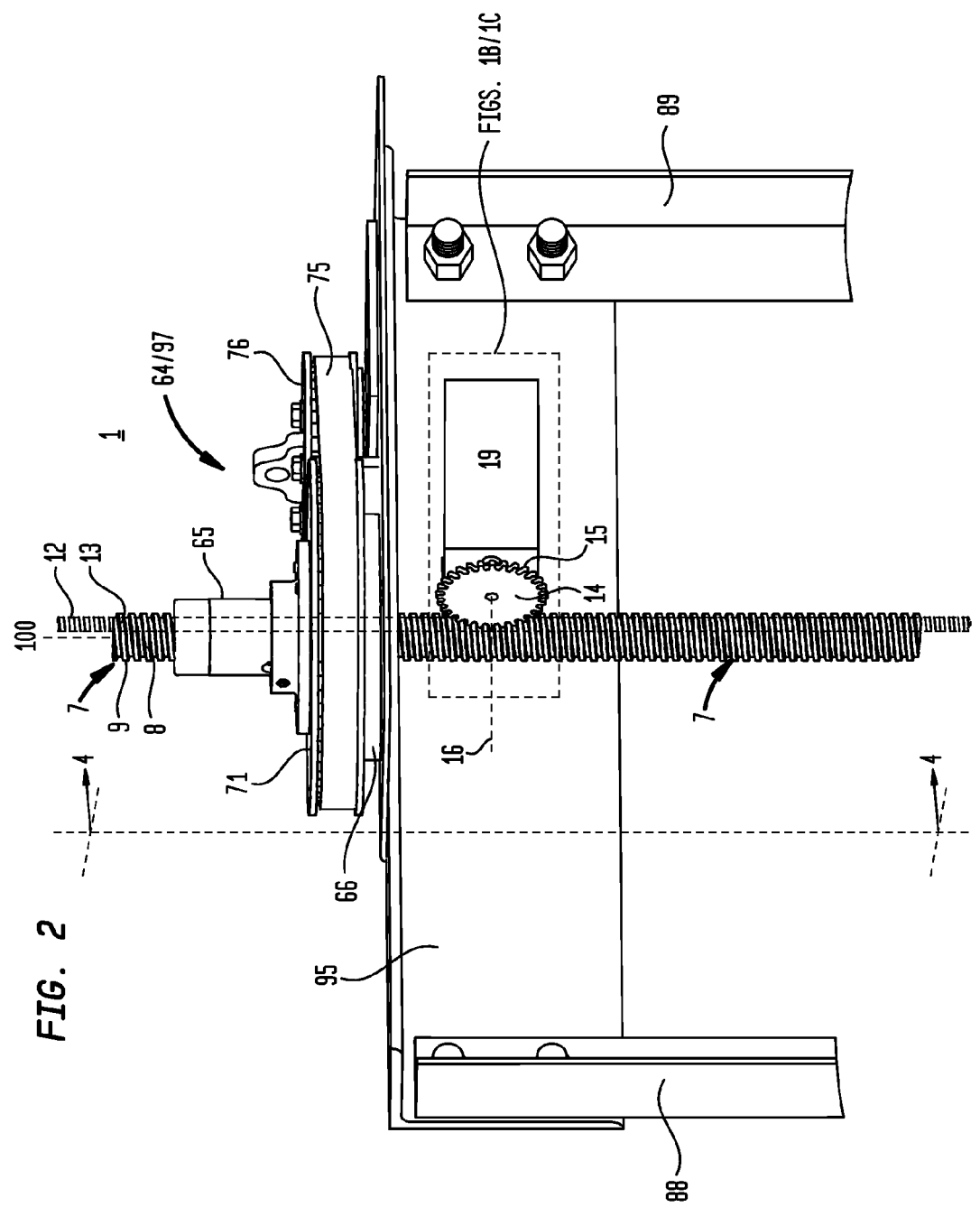

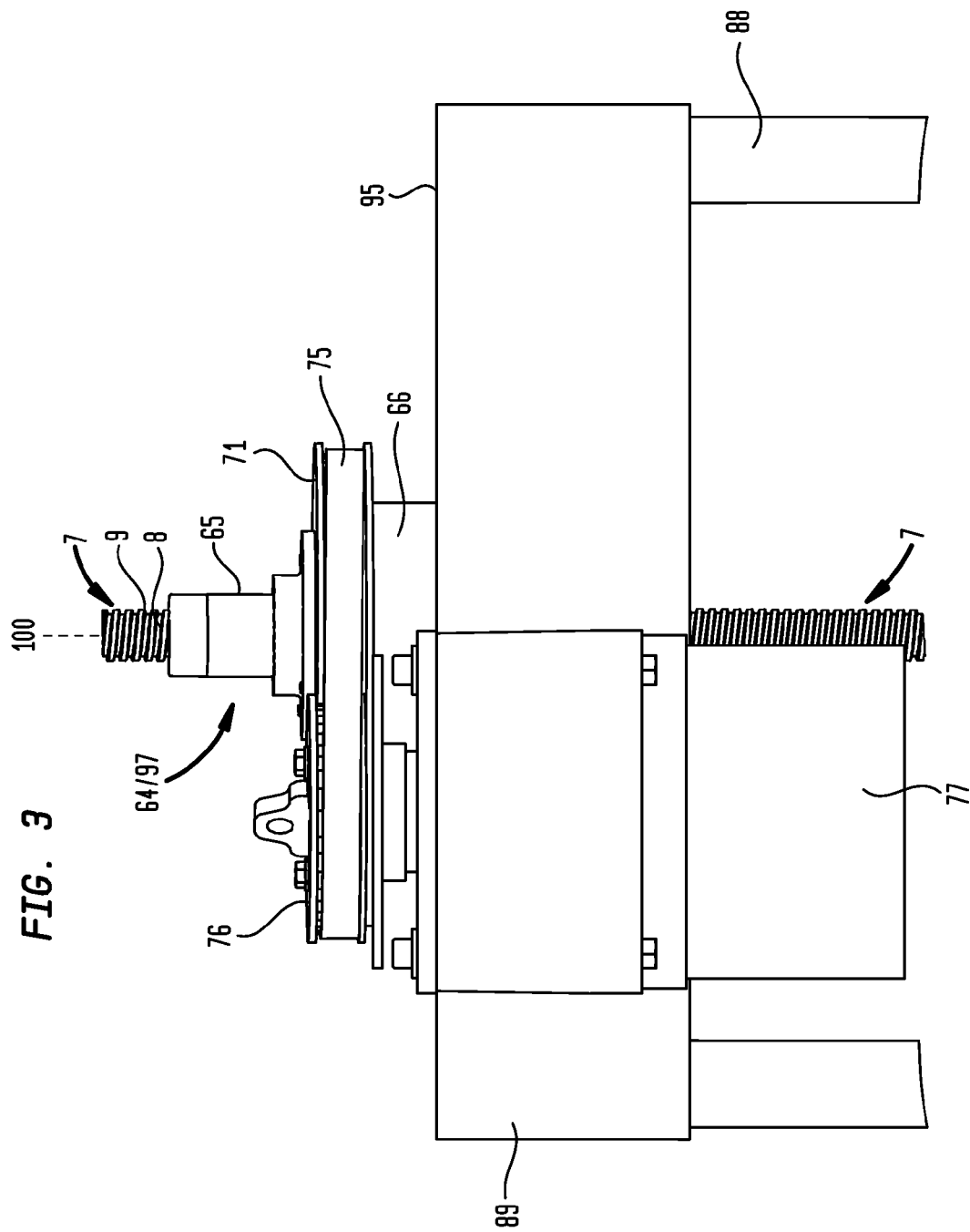

LINEAR POSITION MONITORING SYSTEM

I. TECHNICAL FIELD

Generally, a linear position monitoring system including a rotatable member having a toothed periphery configured to directly rotatably engage a longitudinal linear portion of a spiral thread coupled to an elongate member whereby an amount of linear non-rotational travel of the spiral threaded elongate member directly rotatably drives the rotatable member operationally coupled to a linear position indicator calibrated to translate rotation of the rotatable member about the rotation axis into an elongate member location value corresponding to a location of the elongate member in the amount of linear travel.

II. BACKGROUND

Conventionally, spiral treaded members rotate about a longitudinal axis to generate motion in components matably engaged to the spiral thread. As one example, U.S. Pat. No. 4,114,132 describes rotation of a worm gear to drive a gear carrying rotor. However, there does not appear to be described in the art a rotor having a toothed periphery configured to be driven directly by non-rotational linear travel of a portion of the spiral thread coupled to the external surface of an elongate member, whereby linear non-rotational travel of the spirally threaded elongate member directly acts on the toothed periphery of the rotor to generate rotation about a rotation axis.

Additionally, there does not appear to be any linear position monitoring device whether analog or digital driven by a rotor directly engaged to the linear non-rotational travel of a spirally threaded elongate member to generate elongate member location values each corresponding to a unique location of the elongate member in the range of the linear travel path.

II. SUMMARY OF THE INVENTION

Accordingly, a broad object of the invention can be to provide a rotatable member having a toothed periphery configured to be driven directly about a rotation axis by non-rotational linear travel of a portion of the spiral thread coupled to the external surface of an elongate member.

Another broad object of the invention can be to provide a linear position monitor which generates elongate member location values based upon the rotation of a rotatable member having a toothed periphery driven about a rotation axis directly by non-rotational linear travel of a portion of the spiral thread coupled to the external surface of an elongate member.

Another broad object of the invention can be to provide fluid flow control gate having a gate positionable between an open condition and a closed condition in response to the linear non-rotational travel of a spiral threaded elongate member whereby the unique position of the gate can be determined by operation of a linear position monitor which generates elongate member location values based upon the rotation of a rotatable member having toothed periphery driven directly about a rotation axis by non-rotational linear travel of a portion of the spiral thread coupled to the external surface of an elongate member.

Another broad object of the invention can be to provide a drive assembly which operates to achieve linear non-rotational travel in a spiral threaded elongate member to which a rotatable member having a toothed periphery can be driven directly about a rotation axis to operate a linear position monitor which generates elongate member location values which can be displayed as corresponding viewable elongate member location indicia and can receive selected elongate member location values which provide instructions to the drive assembly to drive the spiral threaded elongate member to the location in the linear travel path corresponding to the selected elongate member location value.

Naturally, further objects of the invention are disclosed throughout other areas of the specification, drawings, photographs, and claims.

III. A BRIEF DESCRIPTION OF THE DRAWINGS

FIG. 1A is an illustration of a particular embodiment of a linear position monitoring system.

FIG. 1B is an illustration of a particular embodiment of a linear position monitor including an analog display.

FIG. 2 is an enlarged portion of FIG. 1A which shows a front view of an embodiment of a flow control gate which includes an embodiment of the inventive linear position monitor and a drive assembly operable to generate an amount of linear travel in an elongate member having a spiral thread coupled the external surface.

FIG. 3 is an enlarged portion of FIG. 1A which shows back view of an embodiment of a flow control gate which includes an embodiment of the inventive linear position monitor and a drive assembly operable generate an amount of linear travel in an elongate member having a spiral thread coupled the external surface.

IV. DETAILED DESCRIPTION OF THE PREFERRED EMBODIMENTS

Figure 1C:
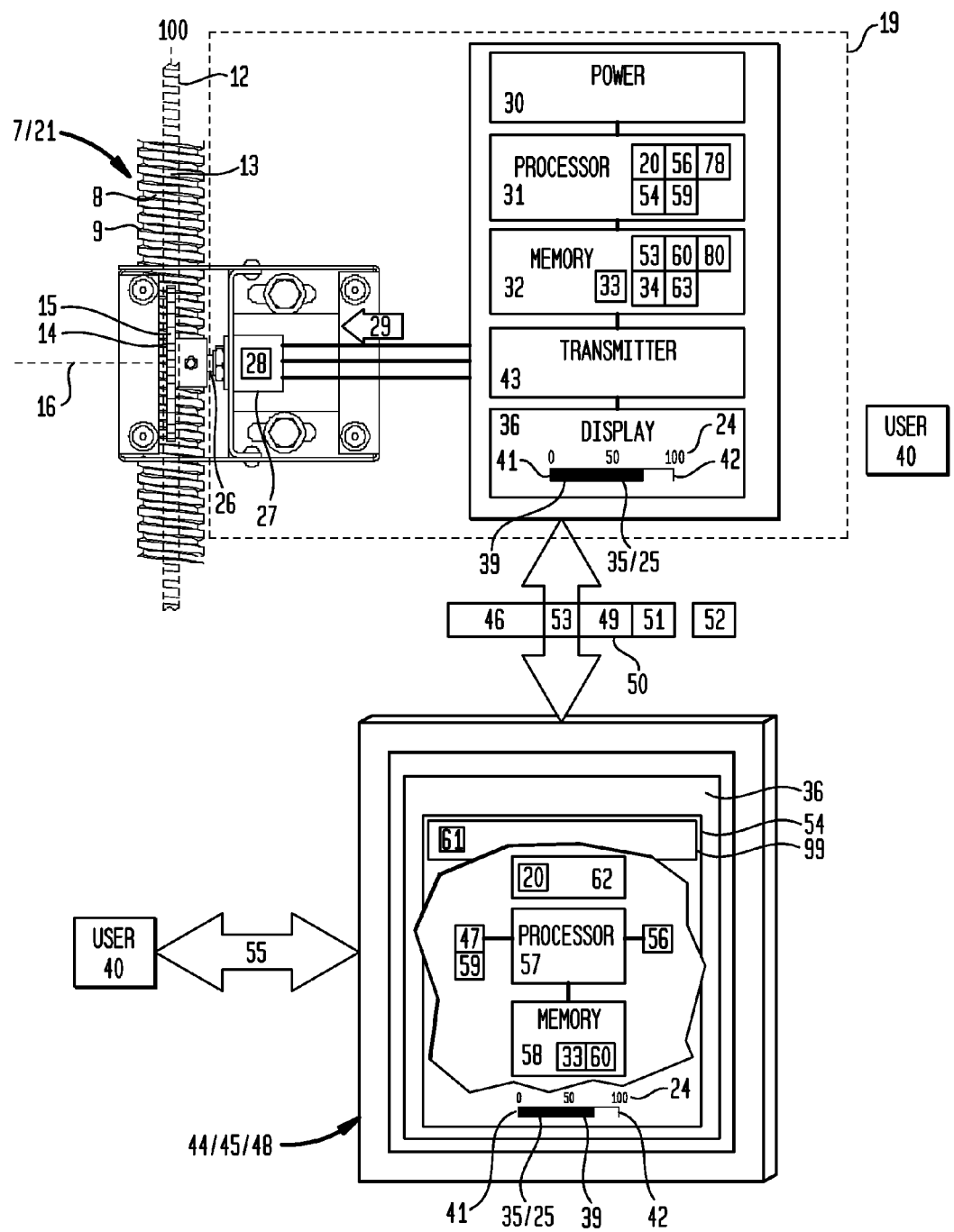
FIG. 1C is an illustration of a particular embodiment of a linear position monitor including a digital display.
Figure 4:
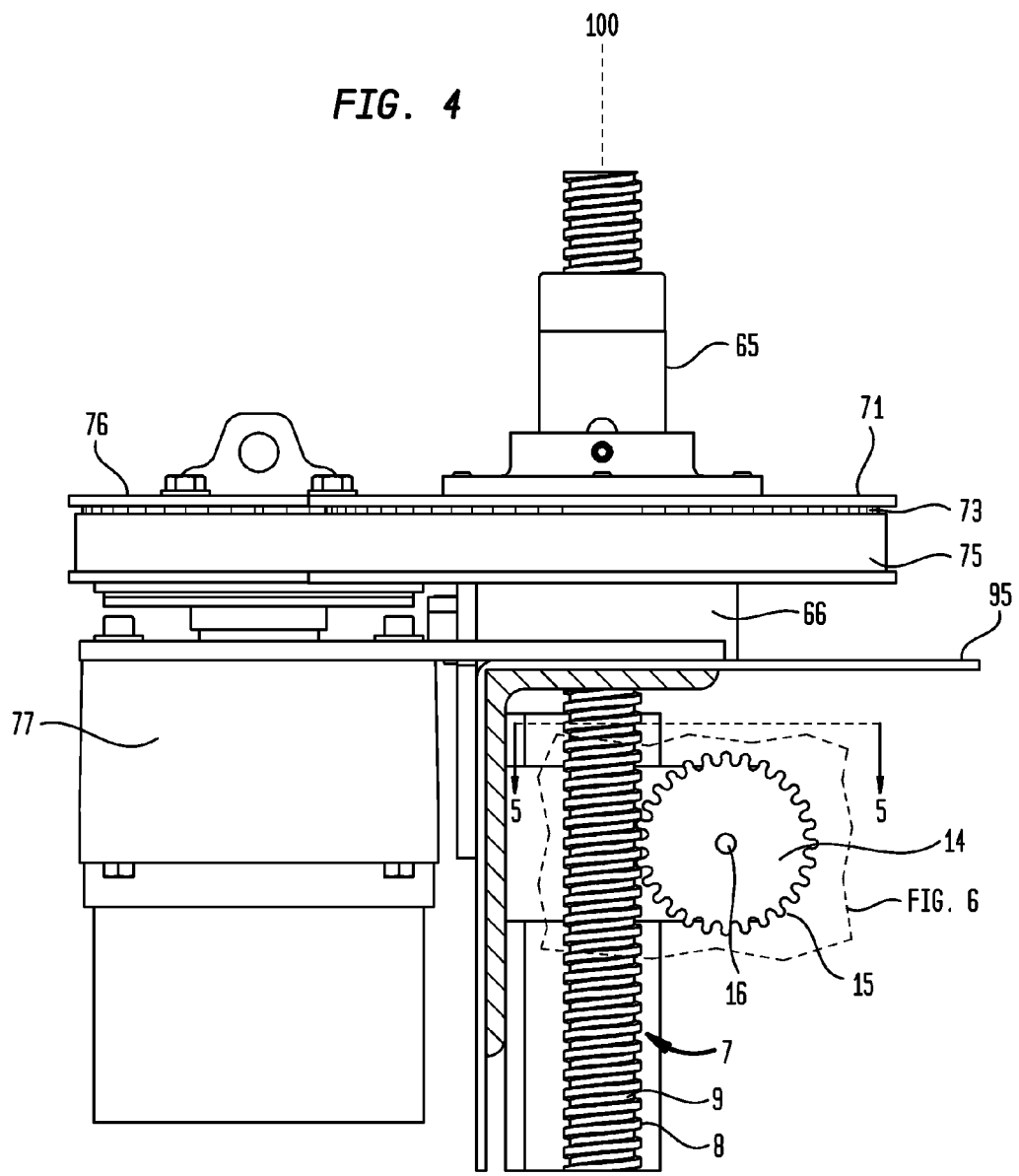
FIG. 4 is a cross section view 4-4 shown in FIGS. 1A and 2.
Figure 5:
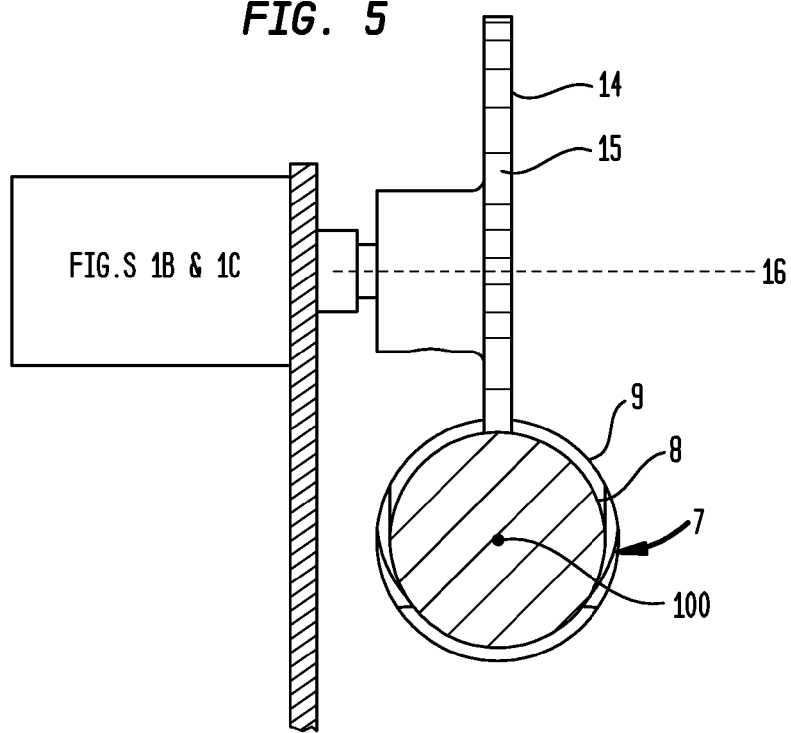
FIG. 5 is a cross section view 5-5 shown in FIG. 4.
Figure 6:
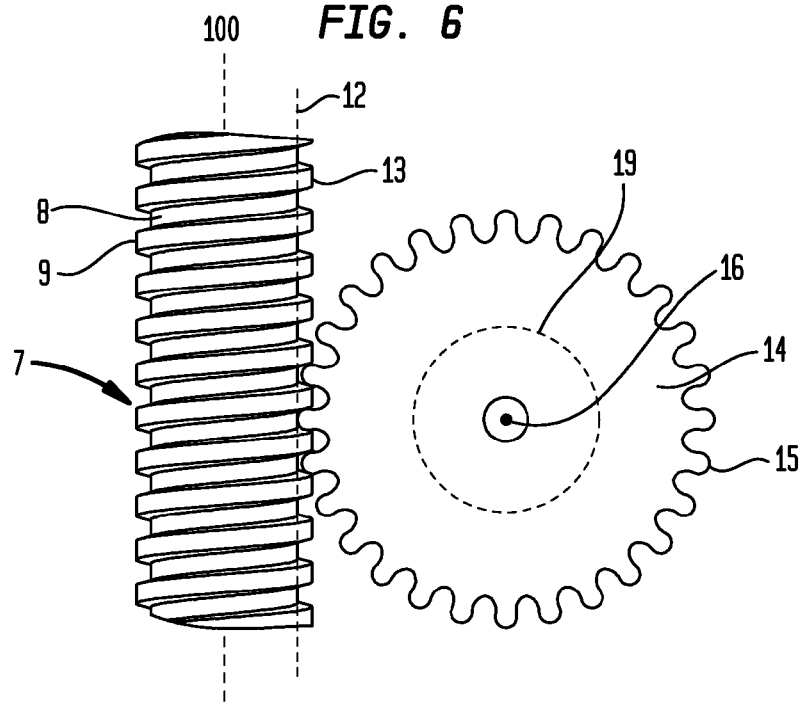
FIG. 6 is an enlarged portion of FIG. 4.
Figure 7:
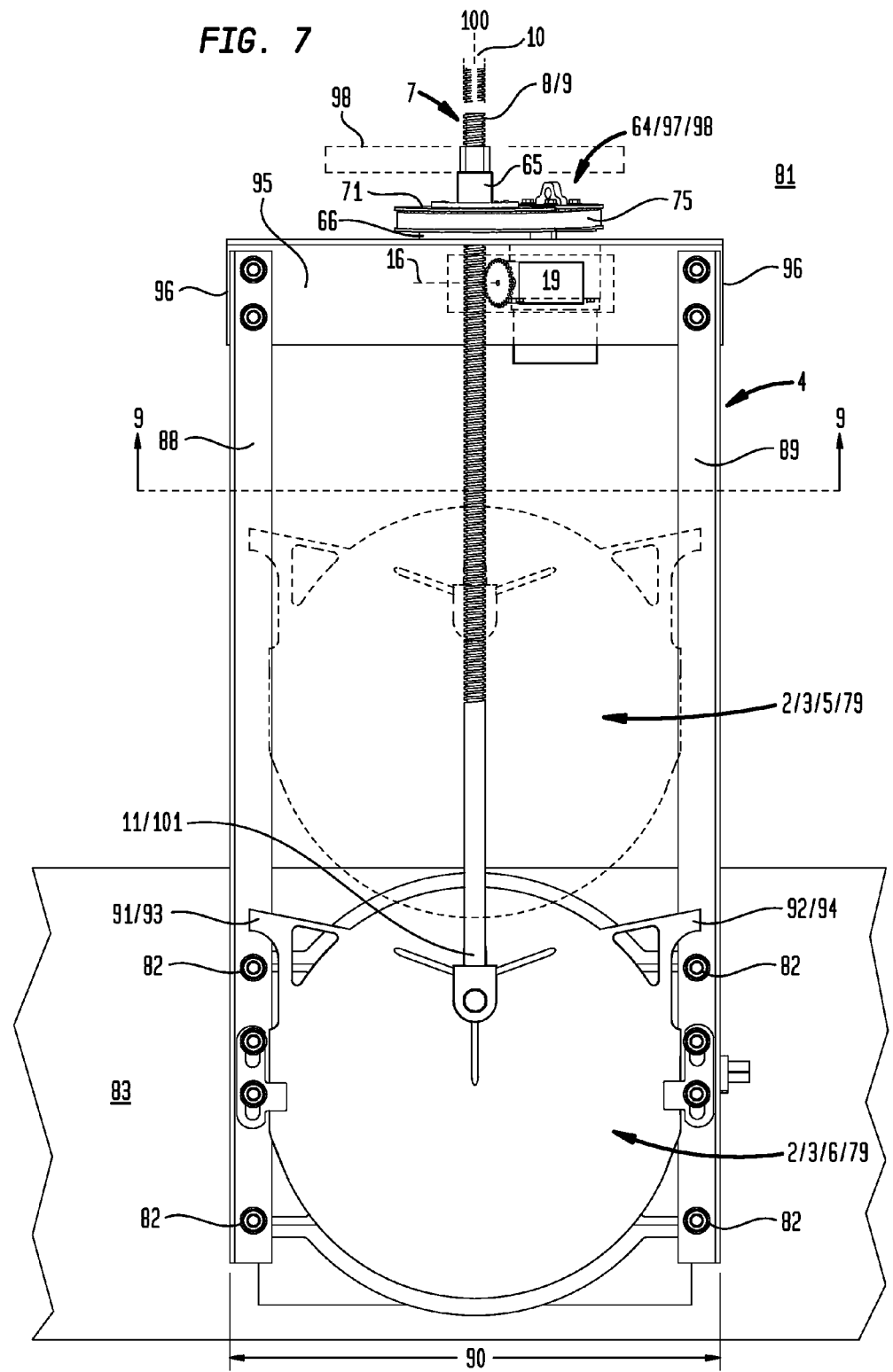
FIG. 7 is a front view of an embodiment of a flow control gate which includes an embodiment of the inventive linear position monitor and a drive assembly operable generate an amount of linear travel in an elongate member to correspondingly move the gate between an open condition shown in broken line and a closed condition shown in solid line.
Figure 8:
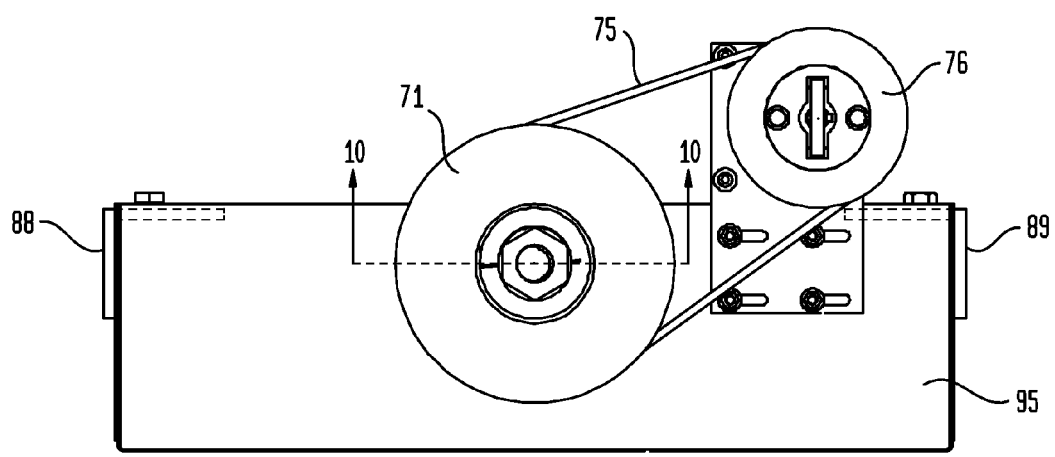
FIG. 8 is a top view of the embodiment of the flow control gate shown in FIG. 7.
Figure 9:
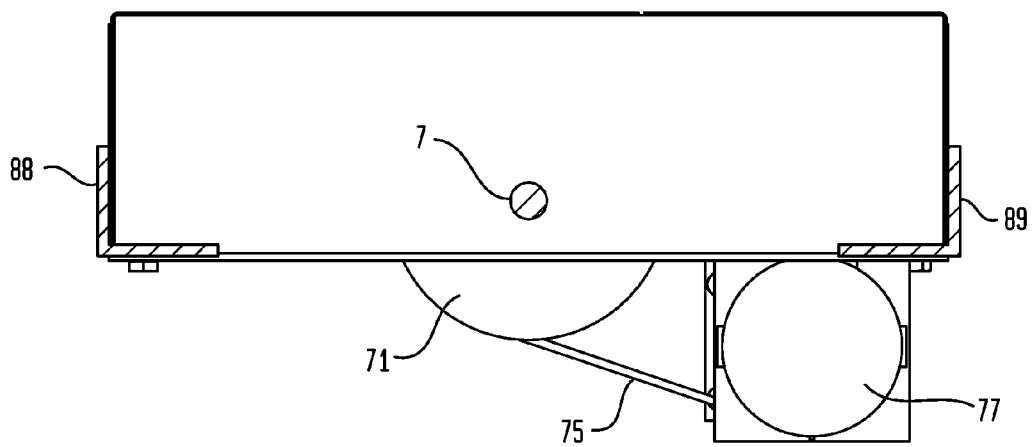
FIG. 9 is a bottom view cross section 9-9 of the embodiment of the flow control gate shown in FIG. 7.
Figure 10:
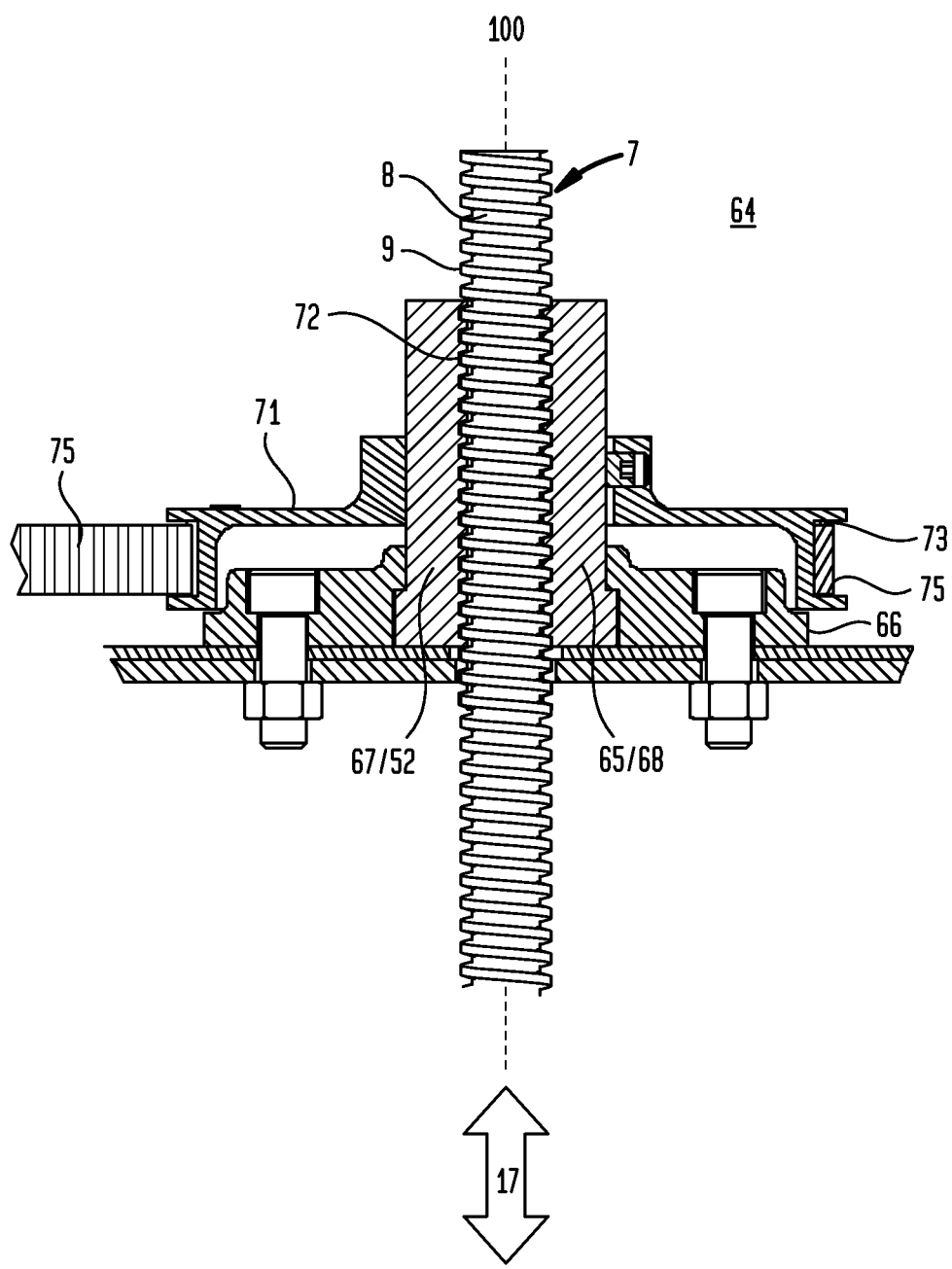
FIG. 10 is cross section 10-10 as shown FIG. 8.

Now referring to FIGS. 1A through 1C and 2 through 13 which provide illustrative examples in overview of an inventive linear position monitoring system (1) (also referred to as the "system") and methods of making and using the system (1). Specifically, FIGS. 1A through 1C and 2 through 13 also provide illustrative examples of particular embodiments of a linear position monitoring system (1) and a method for monitoring the linear position of a displaceable member (2), such as a slide gate (3) as shown in FIG. 1A adapted for displacement in a frame assembly (4) between an open condition (5) (as shown FIG. 1A) and a closed condition (6)(as shown in FIG. 7). However, the illustrative examples shown and described herein are not intended to be limiting solely to slide gate (3) embodiments, but rather sufficient for a person of ordinary skill in the art to make and use, whether in whole or in part, a numerous and wide variety of embodiments of the linear position monitoring system (1).

As to particular embodiments of the system (1), an elongate member (7) can define an external surface (8) of cylindrical form having a spiral thread (9) extending between opposed ends (10)(11). The spiral thread (9) can be sufficiently raised or recessed in relation to the external surface (8) of the elongate member (7) to provide a longitudinal linear portion (12) of the spiral thread (9)(as shown in broken line in the example of FIGS. 1B, 1C and 2) which defines a toothed linear segment (13)(also referred to as "a first plurality of teeth") of spiral thread (9). A rotatable member (14) can have a toothed periphery (15) (also referred to as "a second plurality of teeth") configured to directly rotatably couple to the toothed linear segment (13) of the spiral thread (9)(as shown in the example of FIG. 6). An amount of linear travel (17) of the elongate member (7) directly rotatably drives the rotatable member (14) about an axis of rotation (16). The term "amount of linear travel" as it relates the elongate member (7) means a distance of linear travel substantially without rotation about the longitudinal axis (100) of the elongate member (7). As to particular embodiments, the linearity of travel and the lack of rotation in the elongate member (7) may not be absolute but sufficient to maintain direct contact of the toothed linear segment (13) of the elongate member (7) with the toothed periphery (15) of the rotatable member (14). The term "directly rotatably drives" for the purposes of this invention means that the toothed periphery (15) of rotatable member (14) contacts the toothed linear segment (13) of the spiral thread (9) without any intermediate elements, whereby an amount of linear travel (17) in the elongate member (7) generates a corresponding amount of linear travel (17) in the toothed liner segment (13) which in contact with the toothed periphery (15) of the rotatable member (14) generates a corresponding rotation of the rotatable member (14) about the rotation axis (16).

Now referring primarily to FIGS. 1A through 1C, which provide a general overview of how to make and use embodiments of the inventive linear position monitoring system (1), the system (1) as to particular embodiments can include the elongate member (7) and the rotatable member (14) directly rotatably coupled to the elongate member (7) whereby an amount of linear travel (17) of the elongate member (7) directly rotatably drives the rotatable member (14) about a rotation axis (16). A linear location indicator (19) can be coupled to or driven by the rotatable member (14). The linear location indicator (19) translates rotation of the rotatable member (14) into an elongate member location value (20) corresponding to a location (21) of the elongate member (7) in the amount of linear travel (17). While the illustrative examples of the elongate member (7) have a spiral thread (9) and the rotatable member has toothed periphery (15), particular embodiments may provide an elongate member (7) having a substantially smooth surface contacted by a correspondingly smooth periphery of the rotatable member (14).

Now referring primarily to FIG. 1B, as to particular embodiments of the linear location indicator (19), a gear train (22) can be operationally coupled to the rotatable member (14). The gear train (22) can alter the ratio of rotations of the rotatable member (14) to a greater or lesser number of rotations input to the linear location indicator (19). As an illustrative example, the gear train (22) can drive an analog display (23) calibrated to translate rotation of the rotatable member (14) about the rotation axis (16) into an elongate member location value (20) corresponding to a location (21) of the elongate member (7) in the amount of linear travel (17). The term "calibrated" for the purposes of this invention means that each unique location (21) of the elongate member (7) in the amount of linear travel (17) corresponds with a unique member location value (20) which can displayed as viewable elongate member indicia (35) representative of the unique actual location (21) of the elongate member (7) in the amount of linear travel (17), and without limitation to the foregoing, can be a numerical indicia (24) (as shown in the example of FIG. 1B the linear location indicator (19) positions a pointer on a calibrated scale to provide the elongate member location value (20)). Understandably, other measuring devices could be directly or indirectly coupled and driven by the rotatable member (14).

Now referring primarily to FIG. 1C, as to particular embodiments of the linear location indicator (19), a shaft (26) of a potentiometer (27) can be coupled directly (as shown in the example of FIG. 1C), or indirectly to the rotatable member (14) though a gear train (22), as above described. The potentiometer (27) can generate an amount of resistance (28) to a current (29) generated by a power source (30) which varies based upon rotational position of the shaft (26) of the potentiometer (27). A processor (31) coupled to a memory element (32) containing a computer code (33) including a resistance monitor module (34) which can be executed to translate the amount of resistance (28) of the potentiometer (27) into a corresponding elongate member location value (20) calibrated to a location (21) of the elongate member (7) in the amount of linear travel (17).

As to particular embodiments, the resistance monitor module (34) can further function to display the elongate member location value (20) on a display surface (36) as viewable elongate member location indicia (35) which can be viewed directly by a user (40). The viewable elongate member location indicia (35) can take any of numerous forms such as numerical indicia (24) which as an illustrative example can represent a calibrated scale from 0 through 100 corresponding to percentage of travel of the elongate member (7) between a first end point (37) and a second end point (38) (being the end points of the amount of linear travel (17)), or images (25) which can represent the actual location (21) of the elongate member (7) as an icon (39) such as a tillable bar which fills between a first image end point (41) and a second image end point (42) representative of the amount of linear travel (17) of the elongate member (7) (as shown in the example of FIG. 1C).

As to other embodiments, the linear location indicator (19) can further include a transmitter or transceiver (43) capable of transmitting the elongate member location value (20) to one or more discrete electronic devices (44). As illustrative examples, the electronic device (44) can be individually or collectively one or more of: slate or pad computers, personal digital assistants, cellular telephone phone, personal computer, minicomputers, set-top box or intelligent televisions connected to receive data through an entertainment medium such as a cable network or a digital satellite broadcast, or the like.

Accordingly, as an illustrative example, the electronic device (44) can take the form of a limited-capability computer (45) designed specifically for navigation on the World Wide Web of the Internet (46) and can include an Internet browser (47) such as Microsoft's INTERNET EXPLORER, GOOGLE CHROME, MOZILLA, FIREFOX, or the like, which functions to download and render multimedia content that is formatted in "hypertext markup language" (HTML).

As a second illustrative example, the electronic device (44) can take the form of a cellular telephone (48) operable in a radio network (49)(cellular network or mobile network) distributed over geographic areas (50) (also known as a "cell"), and served by at least one fixed-location transceiver (51)(also known as a "cell site" or "base station"). Each geographic area (50) using a different set of frequencies from neighboring cells (52), to avoid interference and to provide a bandwidth (53) within each cell (50)(52).

In these exemplary environments (or other environments), as to particular embodiments, the processor (31) can be programmed to implement the most significant portions of the computer code (33) including a user interface module (53) executable to display a graphic user interface (54) on the display surface (36) of the electronic device (44) which by user interaction (55) activates the resistance monitor module (34) to display of the viewable elongate member indicia (35) representing the elongate member location value (20) on the display surface (36). As to these embodiments, the computer code (33) which implements the user interface module (56) and the resistance monitor module (34)(and other executable program modules) can be resident in the memory element (32)(as shown in FIG. 1C) and the one or more electronic devices (44) can use the browser (47) to simply display downloaded images and data (collectively "content")(59) and to relay user inputs (56) back to the processor (31). The processor (31) can respond by formatting new pages of the graphic user interface (54) and downloading them for display on the electronic devices (44).

As to other embodiments, the processor (31) executing the computer code (33) can be used primarily as a source of content (59), with primary responsibility for implementing the user interface module (53) and the resistance monitor module (34)(and other program modules) being placed upon each of the one or more electronic devices (44)(see for example FIG. 1C). As to these embodiments, each of the one or more electronic devices (44) can include an electronic device processor (57) coupled to an electronic device memory element (58) containing computer code (33). The electronic device processor (57) can be capable of running the computer code (33) to display the graphic user interface (54) on the display surface (36) and to retrieve, transform and display content (59) transmitted from the processor (31) in the corresponding graphic user interface fields (99) provided in the graphic user interface (54).

Again referring primarily to FIG. 1C, particular embodiments of the computer code (33) can further include a location value adjustment module (60) executable to display a location value selector (61) which by user interaction (55) allows selection of the elongate member location value (20). The electronic device can further include a wireless sender (62) coupled to the electronic device processor (57) capable of transmitting a selected elongate member location value (20) to the processor (31). The computer code (33) included in the memory element (32) can further include a drive assembly control module (63) executable to control a drive assembly (64) operable by the processor (31) to locate the elongation member (7) at a location (21) in the amount of linear travel (7) corresponding to the elongate member location value (20) selected by the user (40) by user interaction (55) with the graphic user interface (54) displayed on the display surface (36) of the discrete electronic device (44).

Now referring primarily to FIGS. 2, 4 and 10 through 12, an illustrative embodiment of the drive assembly (64) includes an internally threaded tubular member (65) rotatably journaled in a housing (66) allowing the internally threaded tubular member (65) to be reversibly rotatably driven within the housing (66). The internal thread (67) of the internally threaded tubular member (65) can be disposed in rotatable mated engagement with the spiral thread (9) coupled to the elongate member (7) whereby rotation of the internally threaded tubular member (65) in the housing (66) about the elongate member (7) generates in the elongate member (7) (substantially without rotation) an amount of linear travel (17).

Figure 11:
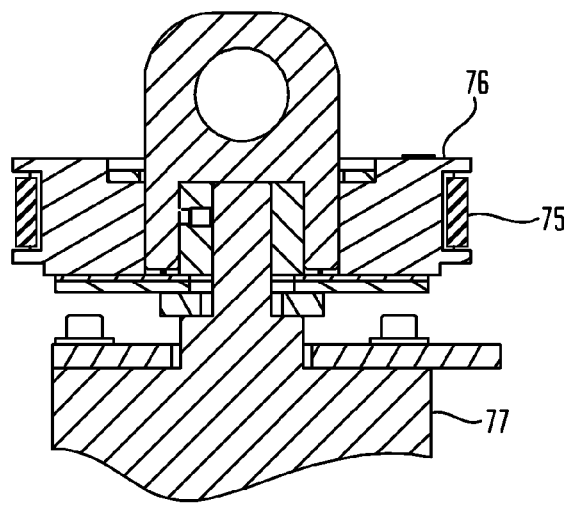
FIG. 11 is a cross section 11-11 as shown in FIG. 12.
Figure 12:
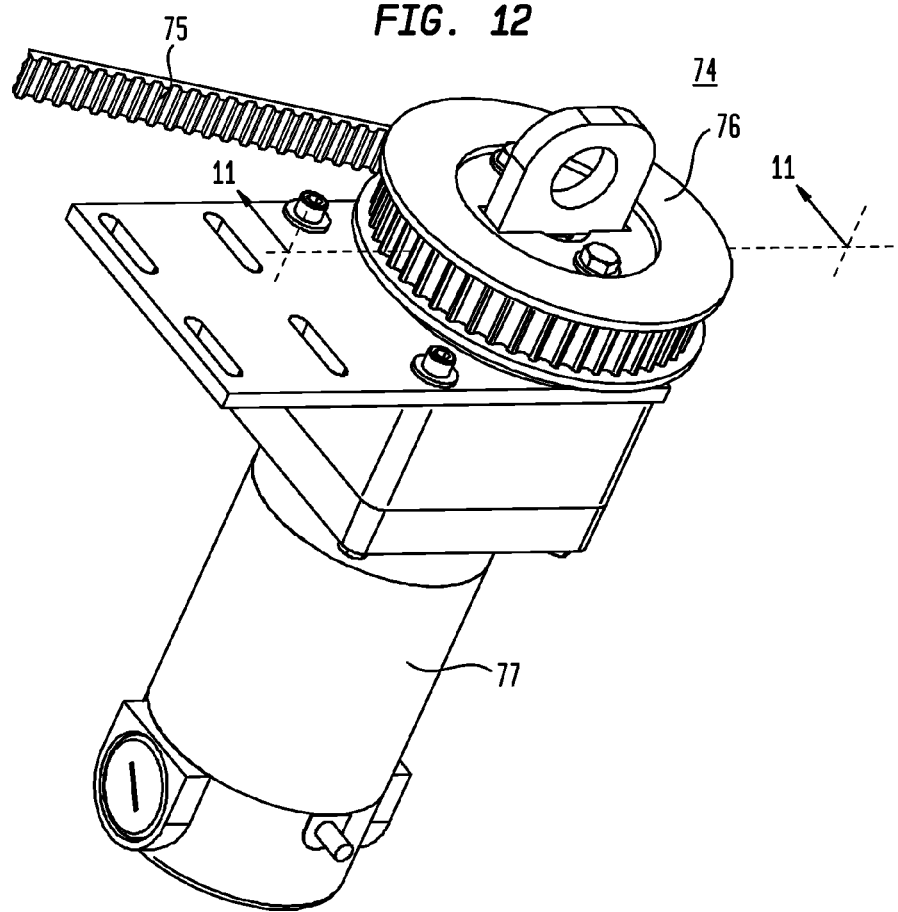
FIG. 12 is a perspective side view of a drive pulley driven by a geared motor.
Figure 13:
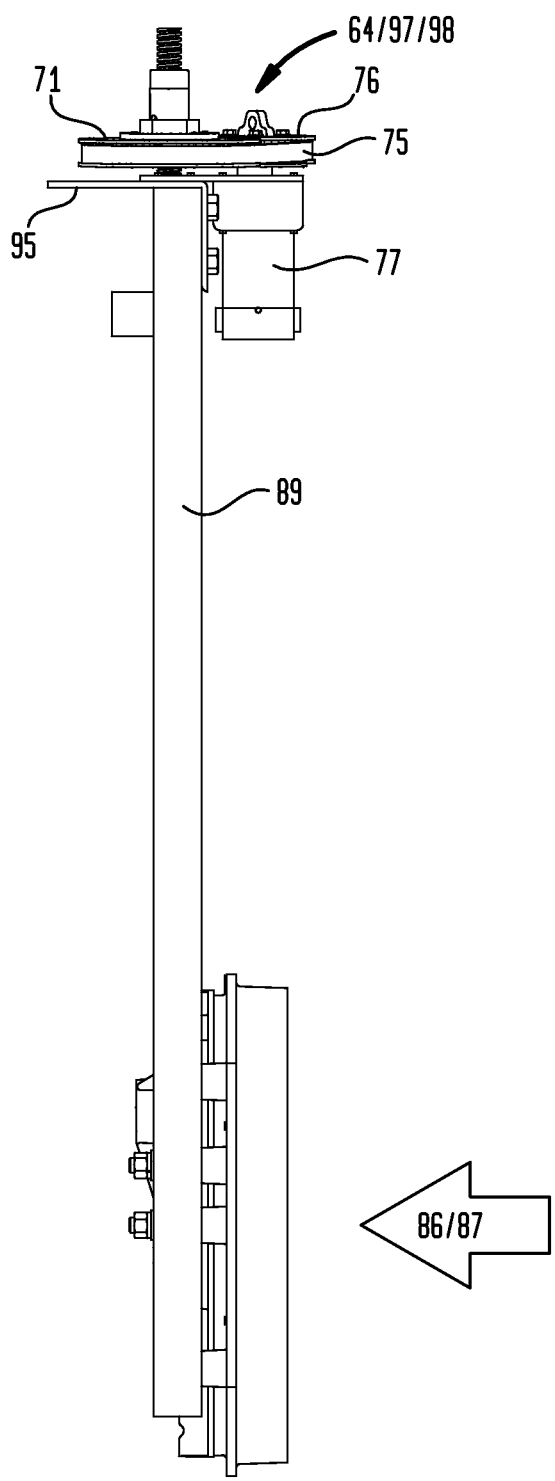
FIG. 13 is a side view of the embodiment of the flow control gate shown in FIG. 7.

As to the particular examples of FIGS. 2, 4 and 10 through 12, the internally threaded tubular member (65) can take the form of an annular member (68)(or a driven pulley (71) coupled to the internally threaded tubular member (65)) having a spirally threaded internal circular surface (72) for rotatable mated engagement with the spiral thread (9) coupled to the elongate member (7) and an external circular surface (73) adapted for engagement with a drive unit (74)(as shown in the example of FIGS. 11 and 12). As to particular embodiments, the drive unit (74) includes an endless belt (75) trained about a driver pulley (76) and the external circular surface (73) of the annular member (68). The driver pulley (76) can be coupled to a motor (77)(for example an electric motor and gear train as shown in the example of FIG. 12) which operates to rotate the driver pulley (76). However, it is not intended that embodiments of the invention be limited only to this exemplary embodiment and any configuration of drive assembly (64) can be utilized which operates to generate an amount of linear travel (17) in the elongate member (7) substantially without rotation thereof.

Now referring primarily to FIGS. 1A, embodiments of the linear position monitoring system (2) can further include the displaceable member (2) coupled to the elongate member (7). The displaceable member (2) can be positionable in response to the amount of linear travel (17) of the elongate member (7). Typically, an amount of linear travel (17) of the elongate member (7) between a first end point (37) and a second end point (38) defines a range of travel (102) in the displaceable member (2) between an open condition (5) (as shown in the example of FIG. 1A) and a closed condition (6)(shown in broken line in the example of FIG. 7). For example, if the displaceable member (2) takes the form of a panel hingedly coupled in a frame, the amount of linear travel (17) between the first end point (37) and the second end point (38) generates operation of the panel between the open condition (5) of the panel and the closed condition (6) of the panel and a location (21) of the elongate member (7) between the first end point (37) and the second end point (38) correspondingly locates the panel at position between the open condition (5) and the closed condition (6). Accordingly, the term "displaceable member (2)" for the purposes of this invention broadly encompasses any object which can be coupled to and moves in response to the amount of linear travel (17) in the elongate member (7).

Again referring to FIGS. 1B and 1C, the linear location indicator (19) can further operate to display a displaceable member location value (78) corresponding to a position of the displaceable member (2). As to analog embodiments of the linear location indicator (19) the rotatable member (14) (whether directly coupled to the analog display (23) or indirectly coupled by a gear train (22) to the linear location indicator (19)) can drive an analog display (23) calibrated to translate rotation of the rotatable member (14) about the rotation axis (16) into an displaceable member location value (78) corresponding to a displaceable member location (79) of the displaceable member (2) between the open condition (5) and the closed condition (6). As to embodiments which include a processor (31) and a memory element (32) (as shown in the example of FIG. 1C whether the display is analog or digital) the computer code (33), above described, can further include a displacement monitor module (80) executable to translate the elongate member location value (20) into a corresponding displaceable member location value (78) corresponding to a position of said displaceable member (2) between the open condition (5) and the closed condition (6). The displaceable member location value (78) can be displayed on a display surface (36) as an image (25) or numerical indicia (24) as above described for the elongate member location value (20).

Now referring primarily to FIGS. 1A and FIGS. 7 through 9 and 13, the displaceable member (2) can take the form of a gate (3) adapted for displacement in a frame assembly (4) between an open condition (5) (as shown in broken line in the example of FIG. 1A) and a closed condition (6)(as shown in unbroken line in the example of FIG. 7). As an illustrative example, a fluid flow control gate (81) includes a frame assembly (4), a gate (3), and a gate operator (97). The frame assembly (4) can include a mount element (82) adapted to anchor the frame assembly (4) in relation to fluid retaining walls (83) such that the frame assembly (4) defines a fluid passageway (84) having an open area (85) which varies based upon position of the slide gate (3) in the frame (4) between the open condition (5) and the closed condition (6). An amount of fluid (86) can pass through the fluid passageway (84)(as shown in FIG. 1A) having a flow rate (87)(which can be expressed as a unit volume/unit time such as gallons per minute) which varies based upon the open area (85) of the fluid passageway (84). For the purposes of this invention the term "fluid" means any liquid flowable through a fluid passageway (84) without limitation to the foregoing can be water.

The frame assembly (4) can include a first gate guide member (88) and a second gate guide member (89) disposed in opposed relation a distance apart (90) and the slide gate (3) can have corresponding side margins (91)(92) adapted to slidably engage the first gate guide member (88) and the second gate guide member (89) allowing sliding displacement of the slide gate (3) in the frame assembly (4) between the open condition (5) and the closed condition (6). As shown in the example of FIG. 7, the side margins (91)(92) of the gate (3) can include a pair of channel elements (93)(94) each of which receive within a corresponding one of the pair guide members (88)(89); however, the gate (3) can be coupled in relation to the frame assembly (4) in any manner which allows the gate (3) to travel between the open condition (5) and closed condition (6) and without limitation to the foregoing, certain embodiments have a first and second gate guide members (88)(89) which each provide a channel element (93)(94) slidingly engaged by a corresponding one of the side margins (91)(92) of the gate (3).

Again referring primarily to FIGS. 7 through 10, a top frame member (95) can be coupled between the pair of guide first ends (96) of the first and second gate guide members (88)(89). The top frame member (95) can in part support the gate operator (97) which operates to move the gate (3) relative to frame assembly (4). Embodiments of the gate operator (97) can for example include an elongate member (7) having a spiral thread (9) extending through the top frame member (95) and a drive assembly (64), as above described. As to other embodiments, a hand wheel (98) (shown in broken line in the example of FIG. 7) which can couple or removably couple to the internally threaded tubular member (65) (or be journaled for rotation in a housing mounted to the top frame member and include a spirally threaded central bore). The internally threaded tubular member (65) can rotatingly mate with the spiral thread (9) coupled to the external surface (8) of the elongate member (7). The elongate member lower end (101) can be coupled to the gate (3). By rotation of the hand wheel (98), an amount of linear travel (17) can be generated in the elongate member (7) in a first direction to raise the gate (3) toward the open condition (5) allowing the fluid (86) to flow through an fluid passageway (84). By rotation of the hand wheel (98) in a second direction, the gate (3) can be lowered toward the closed condition (6).

As can be easily understood from the foregoing, the basic concepts of the present invention may be embodied in a variety of ways. The invention involves numerous and varied embodiments of a linear position monitoring system and linear position monitor and methods for making and using such a linear position monitoring system and linear position monitor including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "monitor" should be understood to encompass disclosure of the act of "monitoring"—whether explicitly discussed or not—and, conversely, were there effectively disclosure of the act of "monitoring", such a disclosure should be understood to encompass disclosure of a "monitor" and even a "means for monitoring." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. The term "about" generally refers to a range of numeric values that one of skill in the art would consider equivalent to the recited numeric value or having the same function or result.

Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the linear position monitoring systems and linear position monitors herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated by reference herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A linear position monitoring system, comprising:
   a) a spirally threaded elongate member having an amount of linear travel;
   b) a rotatable member directly rotatably coupled to said spirally threaded elongate member, said rotatable member having a plurality of teeth coupled in radial spaced uninterrupted succession about the entire periphery of said rotatable member, said plurality of teeth configured to rotatably matably engage a longitudinal linear portion of said spiral thread disposed between opposed ends of said elongate member during said amount of linear travel of said elongate member, whereby said amount of linear travel of said elongate member directly reversibly rotatably drives said rotatable member about a rotation axis; and
   c) a linear location indicator directly coupled to said rotatable member which translates rotation of said rotatable member into an elongate member location value corresponding to a location of said elongate member in said amount of linear travel.

2. The linear position monitoring system of claim 1, wherein said linear location indicator comprises a potentiometer having a shaft directly coupled to said rotatable member, said potentiometer generating an amount of resistance which varies based upon rotational position of said shaft of said potentiometer.

3. The linear position monitoring system of claim 1, further comprising a threaded member having rotatable mated engagement with said spirally threaded elongate member which upon rotation generates said amount of linear travel in said elongate member.

4. The linear position monitoring system of claim 3, further comprising a drive assembly operable to rotate said threaded member in mated engagement to said spiral thread coupled to said elongate member to generate said amount of linear travel in said elongate member.

5. The linear position monitoring system of claim 4, wherein said threaded member comprises an annular member having an internal circular surface spirally threaded for rotatable mated engagement with said spiral thread coupled to said elongate member and an external circular surface adapted for engagement with said drive assembly.

6. The linear position monitoring system of claim 5, wherein said drive assembly comprises an endless belt trained about a driver pulley and said external circular surface of said annular member.

7. The linear position monitoring system of claim 6, further comprising a motor which generates rotation of said driver pulley.

8. The linear position monitoring system of claim 7, further comprising a displaceable member coupled to said elongate member, said displaceable member positionable corresponding to said amount of linear travel of said elongate member.

9. The linear position monitoring system of claim 8, further comprising a processor coupled to a memory element including containing a computer code having a resistance monitor module executable by the processor to translate said amount of resistance generated by said potentiometer into a corresponding elongate member location value corresponding to a location of said elongate member throughout a range of said amount of linear travel, and wherein said computer code further comprises a displacement monitor module executable to translate said elongate member location value into a corresponding displaceable member location value corresponding to a position of said displaceable member.

10. The linear position monitoring system of claim 9, wherein said displaceable member comprises a gate adapted for displacement in a frame assembly between an open condition and a closed condition.

11. The linear position monitoring system of claim 10, wherein said gate comprises a slide gate and said frame comprises a slide gate frame having a first gate guide member and a second gate guide member, said slide gate having corresponding side margins adapted to slidably engage said first gate guide member and said second gate guide members allowing sliding displacement of said slide gate in said frame between said open condition and said closed condition.

12. The linear position monitoring system of claim 11, wherein said displaceable member location value corresponds to said position of said slide gate in said frame between said open condition and said closed condition.

13. The linear position monitoring system of claim 12, wherein said slide gate frame defines a fluid passageway having an open area which varies based upon position of said slide gate in said frame between said open condition and said closed condition.

14. The linear position monitoring system of claim 13, further comprising an amount of fluid having a flow rate through said fluid passageway which varies based upon said open area of said fluid passageway.

15. The linear position monitoring system of claim 9, further comprising a wireless transmitter coupled to said processor which transmits said elongate member location value corresponding to said displaceable member location value to a discrete electronic device.

16. The linear position monitoring system of claim 15, wherein said discrete electronic device has an electronic device processor coupled to an electronic device memory element containing an application code having a user interface module executable by said electronic device processor to display a graphic user interface on a display surface of said electronic device which by user interaction allows display of said elongate member location value and said displaceable member location value on said display surface.

17. The linear position monitoring system of claim 16, wherein said application code further includes a location value adjustment module executable to display a location value selector which by user interaction allows selection of said elongate member location value or said displaceable member location value.

18. The linear position monitoring system of claim 17, wherein said electronic device further comprises a wireless sender coupled to said electronic device processor capable of transmitting said elongate member location value or said displaceable member location value selected by user interaction with said graphic user interface to said processor.

19. The linear position monitoring system of claim 18, wherein said computer code further includes a drive assembly control module included in said memory executable to control said drive assembly to locate said elongation member at a location in said amount of linear travel corresponding to said elongate member location value or said displaceable member location value selected by said user by interaction with said graphic user interface displayed on said display surface of said discrete electronic device.

* * * * *